(12) United States Patent
Schreier

(10) Patent No.: US 6,927,513 B2
(45) Date of Patent: Aug. 9, 2005

(54) ELECTROMECHANICAL SCREW DRIVE ACTUATOR

(75) Inventor: Dennis Michael Schreier, Roscoe, IL (US)

(73) Assignee: Bear Linear LLC, Belvidere, IL (US)

( * ) Notice: Subject to any disclaimer, the term of this patent is extended or adjusted under 35 U.S.C. 154(b) by 53 days.

(21) Appl. No.: 10/609,883

(22) Filed: Jun. 30, 2003

(65) Prior Publication Data

US 2004/0061382 A1 Apr. 1, 2004

Related U.S. Application Data

(60) Provisional application No. 60/392,915, filed on Jul. 1, 2002.

(51) Int. Cl.[7] .............................. H02K 7/06; H02K 7/08
(52) U.S. Cl. ....................... 310/75 D; 310/12; 310/80; 310/90; 74/89.23
(58) Field of Search .................. 310/75 D, 12, 310/15, 17, 20, 75 R, 80, 90; 188/72.8; 192/141; 74/89.23, 424.71

(56) References Cited

U.S. PATENT DOCUMENTS 6,317,287 B1 * 11/2001 Yano et al. ................. 360/260
6,603,228 B1 * 8/2003 Sato ............................ 310/83
6,608,416 B2 * 8/2003 Nishimura ................... 310/90
6,629,649 B2 * 10/2003 Schultz et al. ............ 239/380
6,719,103 B1 * 4/2004 Kapaan et al. ............ 188/72.8
6,772,653 B1 * 8/2004 Franksson ................. 74/89.36
6,776,061 B2 * 8/2004 Schuettel et al. .......... 74/89.36

FOREIGN PATENT DOCUMENTS

| JP | 2003-14069 | * | 1/2004 | ........... F16H/25/20 |
| JP | 2001-86700 | * | 3/2004 | ........... H02K/7/06 |
| JP | 2002-372117 | * | 6/2004 | ........... F16H/25/20 |

* cited by examiner

Primary Examiner—Burton Mullins
(74) Attorney, Agent, or Firm—Leydig, Voit & Mayer, Ltd.

(57) ABSTRACT

An electromechanical linear actuator assembly having in-line axial load support of its screw drive shaft is provided. The bearing support structure provides a single in-line ball bearing accommodated within a hardened end fitting and a screw pivot recess in the axial screw drive shaft. For axial loading in an opposite direction, a number of smaller ball bearings are provided around the outer periphery of the screw shaft in a groove, and are retained within the hardened end fitting by a bearing retainer. End rod support bearings providing heat compensation and lubrication fluid transfer are also provided. A braking mechanism having increased life and more consistent load engagement is also provided. Further, integrated electronics may be provided for position sensing and power efficiency control.

21 Claims, 12 Drawing Sheets

ELECTROMECHANICAL SCREW DRIVE ACTUATOR

CROSS-REFERENCE TO RELATED PATENT APPLICATIONS

This patent application claims the benefit of U.S. Provisional Patent Application No. 60/392,915, filed Jul. 1, 2002.

FIELD OF THE INVENTION

The present invention relates generally to screw drive actuators, and more particularly to a bearing and load distribution system for use in linear screw drive actuators.

BACKGROUND OF THE INVENTION

Linear actuators, such as are used in rugged service industries such as turf care, specialty vehicles, agriculture, service vehicles, construction vehicles, and material handling, typically use a motor (electric or hydraulic), a gear box of a specified ratio, and a screw and nut combination to extend and retract a load. To provide the strongest column load capability and load transfer, a steel screw assembly is designed to pass through an aluminum or zinc die cast gear box, and be secured at a hardened steel end fitting mounting bracket.

In such a screw type linear actuator, the screw must be capable of turning while secured to the end fitting during operation. This ability is provided through a radial thrust bearing and thrust washers. Typically, the thrust washer is affixed to the screw shaft and rotates between the thrust washers that are coupled to the housing to hold the screw shaft in its axial position while transitioning the load. Most linear actuator designs rely on bronze thrust bearings to transfer the actuator load through the drive screw to the end fitting attachment point. However, this arrangement of the thrust bearing and thrust washers causes the axial load on the thrust shaft to be transferred radially to the gearbox housing structure. This requires that the gear box housing structure be designed to carry this load as well as axial shock loads which will be transferred during transient operation of the linear actuator. As a result, stronger gearbox housings are required at a substantially increased cost.

As will be apparent to those skilled in the art, the application of the linear actuators in the rugged service industries identified above subjects the actuators to harsh, all weather environments. Because of these harsh all weather operating conditions, the extension rod end support must be sealed or otherwise close-fitting to the extension rod of the linear actuator to prevent rain, dirt, etc. from entering the linear actuator assembly and potentially fouling the gears or otherwise damaging the internals of the linear actuator. Further, the extension rod between the end fitting coupled to the load and the ball nut within the linear actuator is sealed to prevent the debris from entering the screw portion within the extension rod.

Unfortunately, in current designs these foreign object exclusion requirements have resulted in several problems. For example, the requirement that the rod end support bearing be closely fitting to the extension rod to prevent the ingestion of foreign debris results in increased heat generation at this point of contact as the tube is extended and retracted therethrough. In extreme operating environments, this increased heat may cause binding between the end rod support bearing and the extension rod such that the efficiency of the extension and retraction of the linear actuator is decreased. Further, the increased friction tends to further increase the heating of the bearing and extension rod, and may result in damage to the exterior surface of the extension rod with continued operation during such conditions.

Another problem relates to the fact that within the sealed extension rod there is a rolled screw end configuration with integral rod support that provides the internal support for the extension rod in coordination with the external end support bearing just discussed. However, this configuration creates two separate cavities within the extension rod that are separated by the rolled screw end configuration with integral rod support bearing. As the linear actuator extends and retracts this tube, the pressure in these two cavities is greatly varied.

Specifically, as the tube is extended, the pressure within one cavity is increased as the gas therein is compressed between the end of the tube and the integral rod support bearing. On the other side of this support bearing, the pressure is greatly reduced as the volume increases between that end of the tube and the internal support bearing. The pressure in each of these two cavities tends to increase the overall load on the linear actuator, which also results in a reduction in efficiency and the generation of heat within the tube. While the pressure differentials will often equalize themselves once the linear actuator reaches its stationary position because the two cavities are not completely sealed from one another by the integral bearing, or between themselves and the internal cavity of the linear actuator between the steel screw and the end nut, the problem will again reappear when the linear actuator is extending or retracting the load until a new stationary position is reached and the two cavities are allowed to equalize their pressure.

A related problem relates to the lubrication within the tube. That is, since the internal rod support bearing is closely fitted to the inner diameter of the extension rod, lubrication within the extension rod cannot move between these two cavities. As a result, and especially during extended operation with the linear actuator and its extended position, the lack of lubrication in the extended end cavity can result in problems in operation, including increased friction, and heat generation.

Another problem existing with current linear actuators relates to the static load holding brake which may be required for particular applications. Specifically, typical static load holding brakes utilize a bearing between two washers, one coupled to the shaft and one to the brake assembly. As pressure from the load pushes on the linear actuator extension rod, this pressure presses the first washer against the wear bearing, which in turn is pressed against the second brake washer. As the friction between these surface connections increases with the increasing pressure, the brake is engaged to stop any further back driving of the extension rod. However, the wearing of these surfaces results in dust building up on the surfaces, which affects the accuracy of the brake and the load at which braking occurs, and can result in slippage once the brake has been engaged.

Therefore, there exists a need in the art for a linear actuator that can withstand the extreme environmental conditions while overcoming the above and other problems existing in the art.

BRIEF SUMMARY OF THE INVENTION

In view of the above, the present invention provides a new and improved linear actuator that overcomes many of the problems existing in the prior art. More particularly, the present invention is directed to an improved linear actuator suitable for use in harsh, all-weather environments as typically encountered in the rugged services industries.

In accordance with one aspect of the present invention, an Integral Ball Bearing Screw End-Fitting (IBBSEF) is used to reduce the friction load that is developed in the linear actuator during dynamic load transfer. The IBBSEF offers an improvement over previous thrust bearing arrangements discussed above by providing both thrust and radial load carrying capability. The screw end is machined and hardened with a radial groove that becomes the inner race for several hardened ball bearings. In one embodiment, seven ball bearings are used. At the end of the screw, a single larger ball bearing is placed between the screw end and machined bearing seat in the end fitting. With this arrangement the thrust loads on the actuator are carried more efficiently than with a simple radial thrust bearing used in competitive actuators as the axial thrust loading is carried axially and is not transferred to the gearbox housing.

Because the radial groove bearings and the large the thrust ball bearing at the end of the screw are on different dimensional planes, they allow the actuator to carry side loads or offset loads in a more efficient manner than competitive actuators providing simple thrust bearing arrangements. Further, this arrangement is more efficient than a radial thrust bearing package using tapered roller bearing where the bearings handling thrust and radial load are inherently on the same plane. By keeping a dimensional distance between the end load carrying thrust bearing and the radial load carrying bearings, the screw's column load is supported and radial support for offset loads being moved by the actuator is provided.

This aspect of the invention transfers the actuator load directly through the screw shaft and into the attachment end fitting with an efficient ball bearing arrangement using the large single ball for compression load transfer and the plurality of smaller balls around the perimeter of the screw shaft for tension loads. This multi-ball arrangement around the circumference of the screw shaft also provides rotational bearing support of the shaft. This unique configuration is more efficient in load transfer using less parts, less horsepower loss, larger load capability in a similar unit size and results in a quieter design.

The result of this bearing arrangement is the ability to move loads with more efficiency. The efficiency is achieved because the IBBSEF allows the screw and nut assembly to have less frictional drag with both thrust and side loads applied. The higher efficiency is seen as lower current draw on the motor, and higher load capability versus a dimensionally and functionally similar competitive actuator.

In another aspect of the present invention, the extension rod driven by the drive screw rides on an acetyl bearing at the end of the drive screw. This bearing support is used in conjunction with a like acetyl extension rod bearing in the extension rod. This provides a solid extension rod bearing support providing larger side load capability of the actuator. Additionally, when used with the attachment end ball bearing configuration, this aspect provides a stable two-point bearing configuration for the screw shaft. This results in more efficiency, less side load drag, compensation for misalignment and greater column load capability.

Further, the acetyl extension rod bearing attached to the screw also serves two other purposes. It provides a solid means of end travel stop. The acetyl bearing provides the stop while also minimizing the tendency for lockup due to its low friction characteristics. Prior designs use needle bearings for this purpose. The acetyl bearing is less costly and also is machineable to incorporate lubrication transfer grooves. Theses grooves allow screw lubrication to be pumped from one side of the bearing to the other as the screw extends and retracts. This results in lubrication redistribution onto the screw providing longer screw life without the need for outside maintenance. The grooves also allow pressure equalization between the two cavities within the extension rod.

In yet a still further aspect of the present invention, the external tube end support bearing, which operates in conjunction with the internal extension rod bearing to support the extension rod, includes a groove on its inner surface. This groove provides thermal compensation for the friction heat generated during operation of the actuator as discussed above. This thermal compensation decreases the increased friction that may otherwise occur.

In another aspect of the present invention, the load holding brake of the actuator is designed to reduce the braking force variances that typically occur as a result of the accumulation of brake dust on the braking friction surfaces. Specifically, the friction surfaces of the brake washers are specially treated to ensure a hard, smooth surface that will engage the brake bearing sandwiched therebetween. Preferably, the contact friction surfaces of the brake washers are subjected to a reactionary electroless machining (REM) process to produce a very smooth, very hard contact surface. Further, the two contact surfaces of the brake bearing have grooves machined therein. These grooves provide an area in which the brake dust can collect. This allows the actual braking surfaces to remain clean, which results in consistent braking force over the lifetime of the brake. Further, the brake bearing is preferably made from an acetal resin that provides reduced wear and friction for increased life. This bearing also includes an angled surface profile that also contributes to its consistent performance.

Other features, aspects, and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
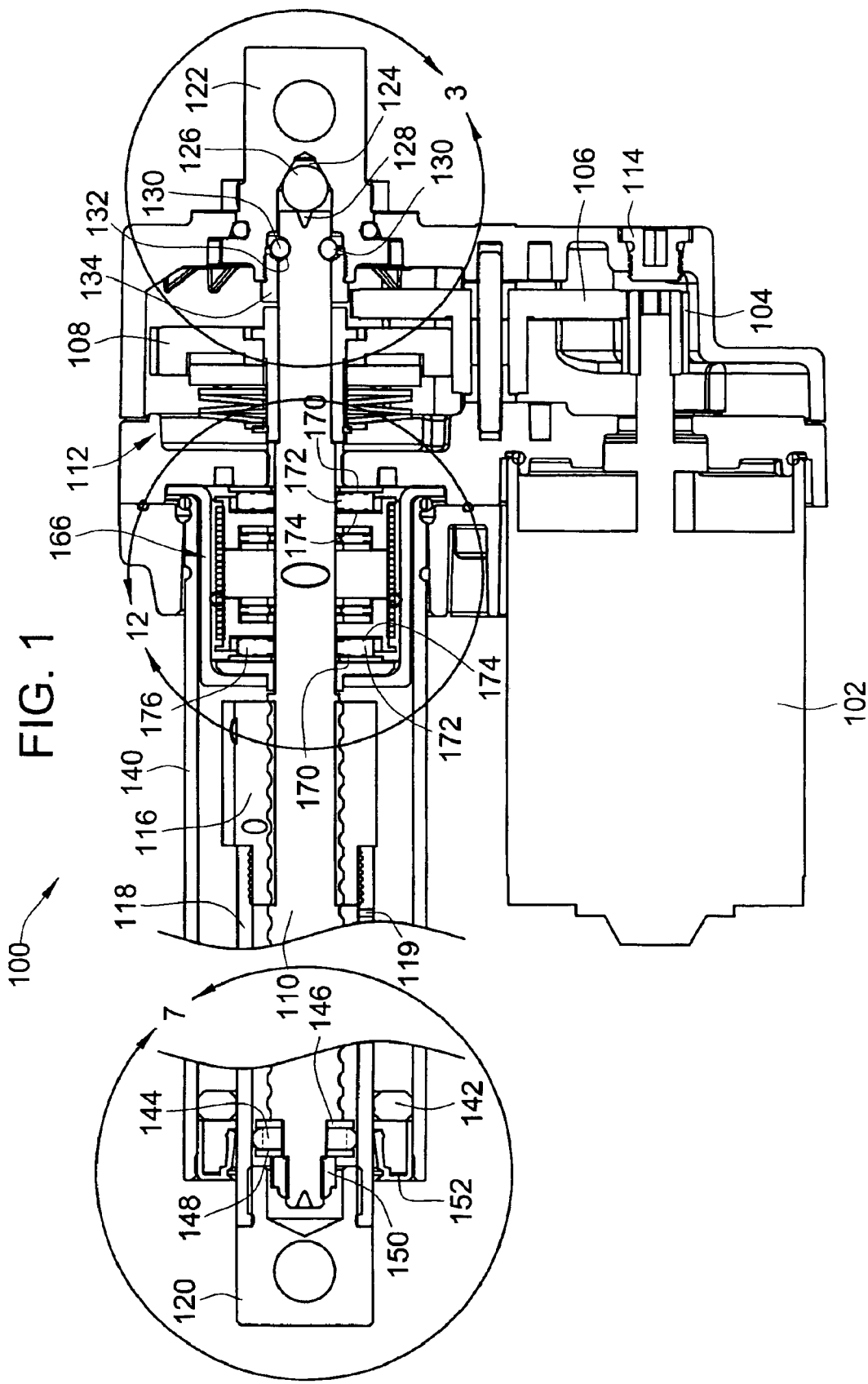
FIG. 1 is a simplified cross-sectional illustration of an electro-mechanical screw drive actuator constructed in accordance with the teachings of the present invention.

Turning now to the drawings, there is illustrated in FIG. 1 a simplified cross-sectional view of an embodiment of an electromechanical screw drive actuator 100 constructed in accordance with the teachings of the present invention. In this embodiment, an electric motor 102 is drivably coupled through an output gear train assembly, including output pinion gear 104, reducer gear 106 and drive gear 108, to a drive screw shaft 110. In the embodiment shown in FIG. 1, a clutch assembly 112 is used to provide the final drive coupling between the final drive gear 108 and the actual drive screw shaft 110 to protect the gear assembly and motor from transient mechanical shock loads that might otherwise damage the teeth of the gears. A manual override access point 114 is provided to allow manual control of the actuator 100 without requiring electric power to be supplied thereto. This manual override is particularly helpful during installation of the actuator 100. It should be noted, that while the embodiment illustrated in FIG. 1 utilizes an electric motor 102, one skilled in the art will recognize that other sources of motive power, e.g. hydraulic motors, pneumatic motors, etc., may be utilized without departing from the spirit and scope of the invention.

As the source of motive power 102 drives the drive screw shaft 110, a ball, acme, or hybrid nut 116 is linearly translated along the screw drive shaft 110, depending on the direction of rotation thereof. The material for this nut 116 is somewhat dictated by the environment into which the actuator 100 will be used, and is preferably constructed of bronze or Delrin® acetal resin available from E.I. DuPont de Nemours, to provide broad load and performance capability. Affixed to the nut 116 is an extension rod 118. At the opposite end of this extension rod 118 there is affixed an end fitting 120, which is typically coupled to the load to be driven. Operation of the motor 102 in a first direction serves to extend the nut 116, extension rod 118, and end fitting 120 assembly, while operation of the motor 102 in the opposite direction retracts this assembly in a linear fashion as is well known in the art.

Unique to the present invention is the mechanism by which the drive screw shaft 110 is carried and the load thereon is supported by the hardened end fitting 122 at the opposite end of the extension rod end fitting 120. Unlike prior linear actuators that utilized a radial thrust bearing, which transferred the load on the shaft to the gearbox housing and then to the end fitting, the linear actuator of the present invention provides a bearing recess 124 in which a single in-line ball bearing 126 is carried. The drive screw shaft 110 also includes a ball bearing screw pivot recess 128 to accommodate the in-line bearing 126. This in-line arrangement between the drive screw shaft 110, the bearing 126, and the hardened end fitting 122 efficiently transfers the axial load from the drive screw shaft 110 to the hardened end fitting 122 without requiring a heavy duty gear box housing as required to carry this load in the prior actuator designs. Further, this configuration provides support for the drive shaft 110 and accommodates any angular displacement, movement, or misalignment of the screw shaft 110 without binding as may be the case with a traditional thrust bearing and thrust washer support arrangement.

Figure 3:
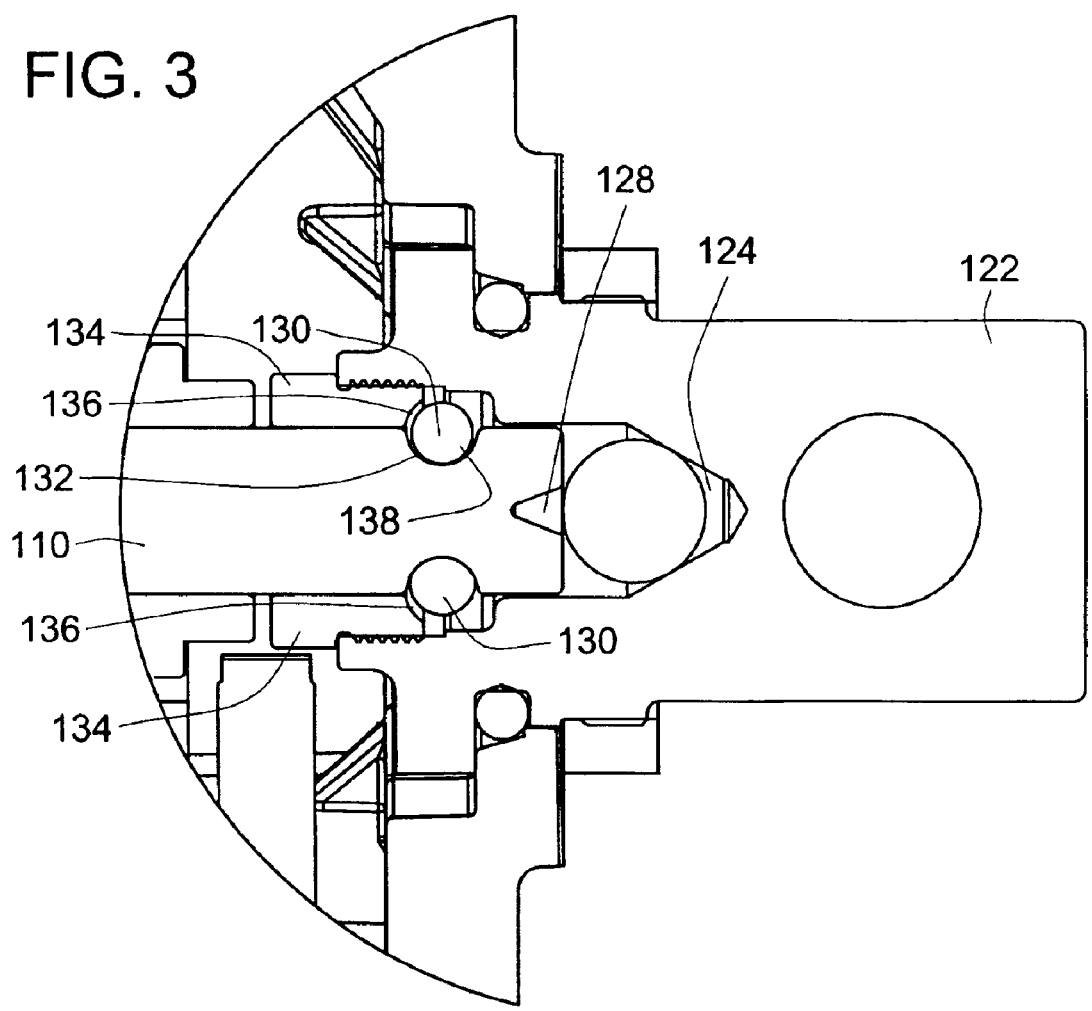
FIG. 3 is an enlarged partial sectional view of the end bearing and load distribution assembly of the electromechanical screw drive actuator of FIG. 1.

While the in-line bearing 126 carries the axial load when a force is applied from the end fitting 120 to the screw shaft 110, axial support for the screw shaft 110 in the opposite direction is provided by a plurality of bearings 130 that are positioned radially around the screw shaft 110 in a groove or bearing race 132 provided therein. Specifically, axial load tending to extend the end fitting 120 is transferred from the screw drive shaft 110 through the ball bearings 130 to a bearing retainer 134 that is secured to the hardened end fitting 122. The bearing retainer 134 includes an axial groove 136 against which the bearings 130 ride when this tension load is applied to the screw drive shaft 110. As may be seen more clearly in FIG. 3, as an axial tension load operates on the screw drive shaft 110 in a direction tending to pull the screw drive shaft 110 out of the assembly, this axial load is transferred from surface 138 of the bearing race or groove 132 in the screw drive shaft 110, through bearings 130, to the axial groove 136 in the bearing retainer 134. Since this bearing retainer 134 is secured to the hardened end fitting 122, this axial tension load is efficiently transferred to the end fitting 122 without being transferred to the gearbox housing as was the case in previous designs.

Figure 4:
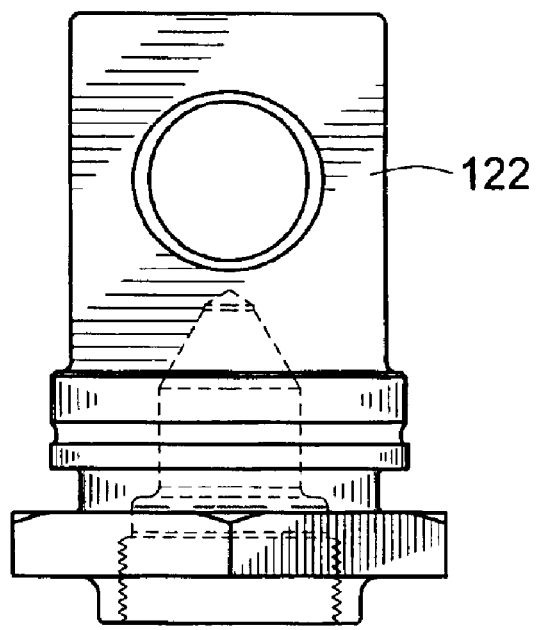
FIG. 4 is a side view illustration of the end fitting of the screw drive actuator of FIG. 1.
Figure 5:
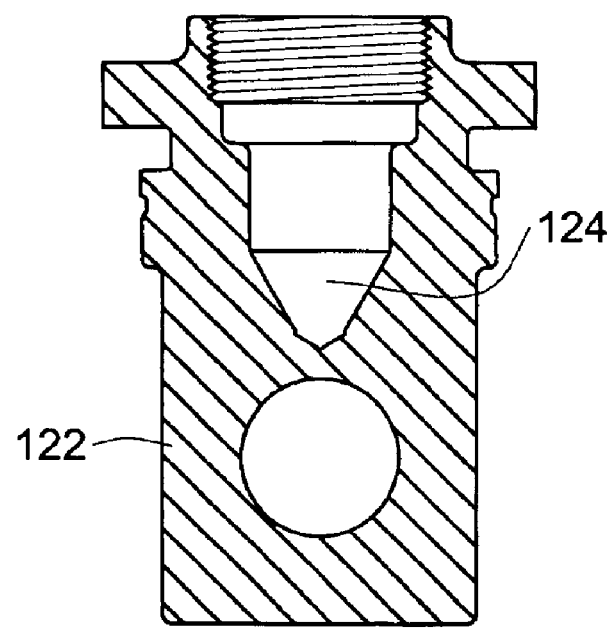
FIG. 5 is a cross-sectional view of the end fitting of FIG. 4.
Figure 6:
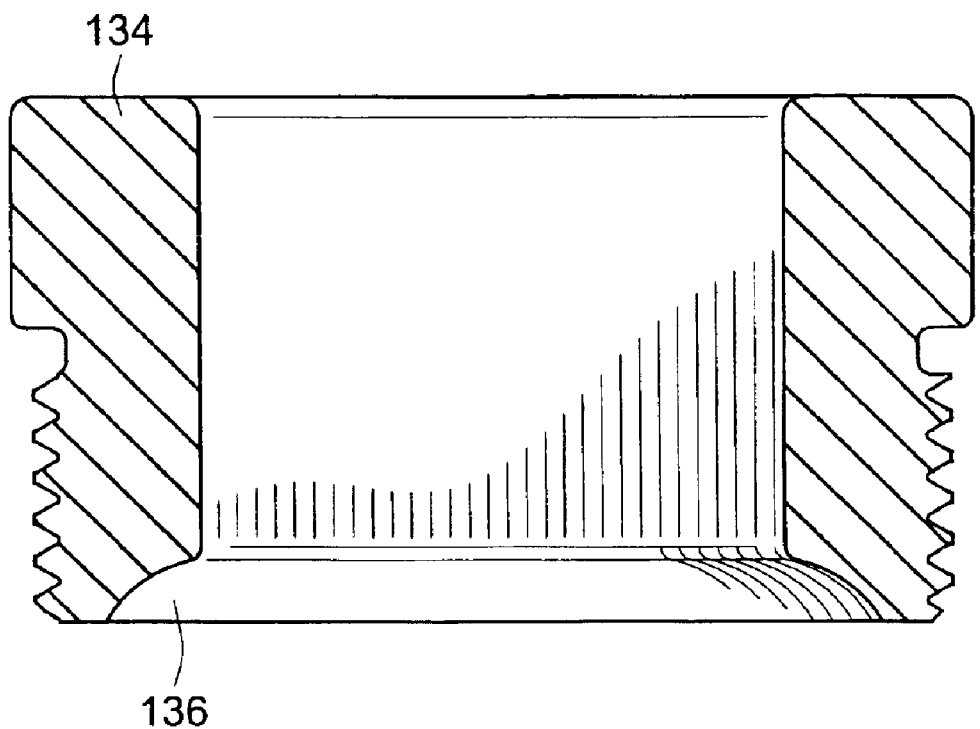
FIG. 6 is a cross-sectional illustration of a bearing retainer forming a part of the electromechanical screw drive actuator of FIG. 1.

Additional details of the hardened end fitting 122 may be apparent to those skilled in the art from an examination of the isometric view illustration of this end fitting 122 in FIG. 4, and from the cross-sectional view illustration of the end fitting 122 in FIG. 5. Similarly, FIG. 6 provides an enlarged cross-sectional illustration of the bearing retainer 134 that clearly shows the axial bearing groove 136.

Figure 7:
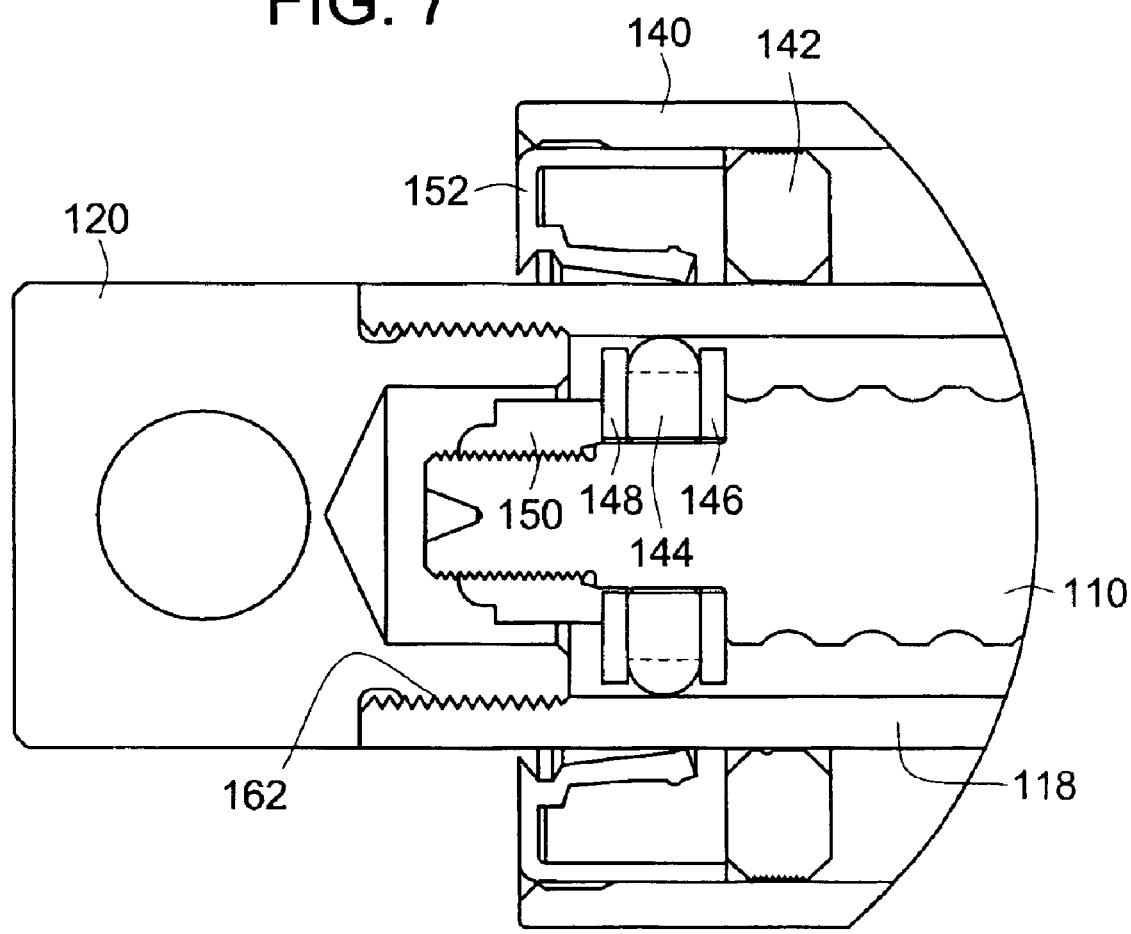
FIG. 7 is an expanded partial sectional illustration of the rod support bearing and rod guide of the electromechanical screw drive actuator of FIG. 1.

Returning again to FIG. 1, attention is directed to the end of the extension rod 118 on which the end fitting 120 is attached. It is noted that an enlarged partial cross-sectional view of this end is also illustrated in FIG. 7. As may be seen, the extension rod 118 is supported within the extension tube 140 and at the end thereof by an external radial bearing support 142, and an internal rod guide bearing 144 positioned between two washers 146, 148 and held in place by nut 150 affixed to the end of screw drive shaft 110. Preferably, a hydraulic cylinder type rod and wiper/seal 152 is included at the end of the extension tube 140 to minimize the possibility of external contaminants entering the extension tube 140 upon retraction of the extension rod 118. The combination of this external bearing support 142 and the internal rod guide bearing support 144 provides smooth operation, weather tight sealing, and resistance to high side loads applied to the end fitting 120.

Figure 8:
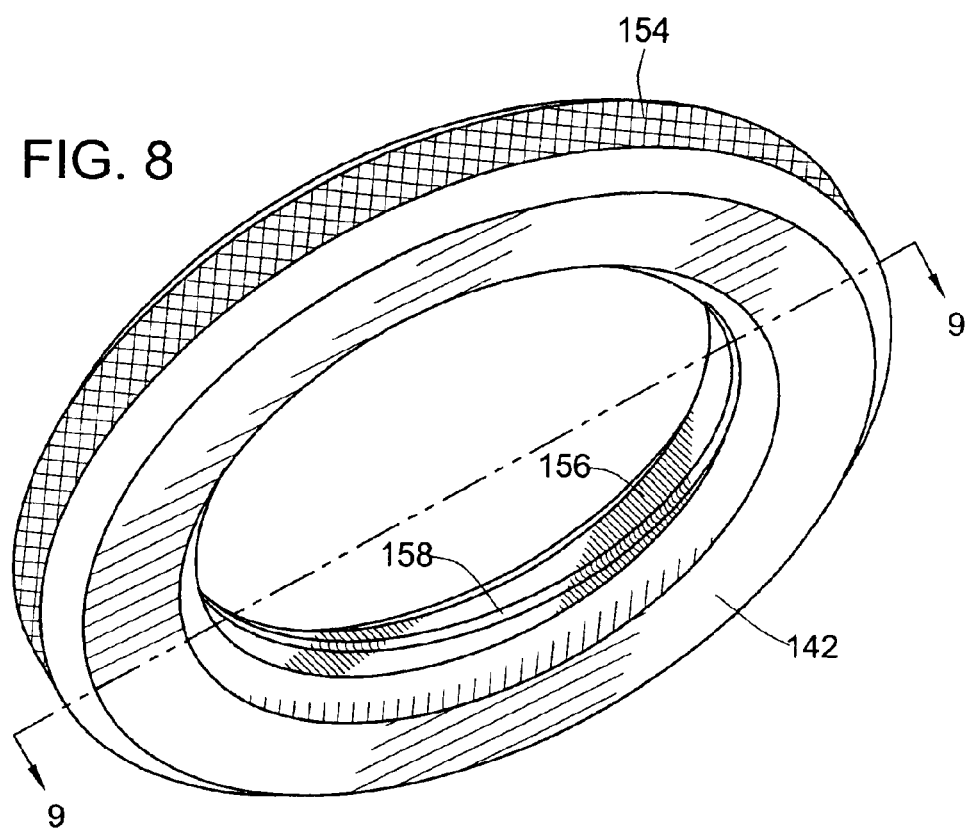
FIG. 8 is an isometric illustration of the rod support bearing of FIG. 7.
Figure 9:
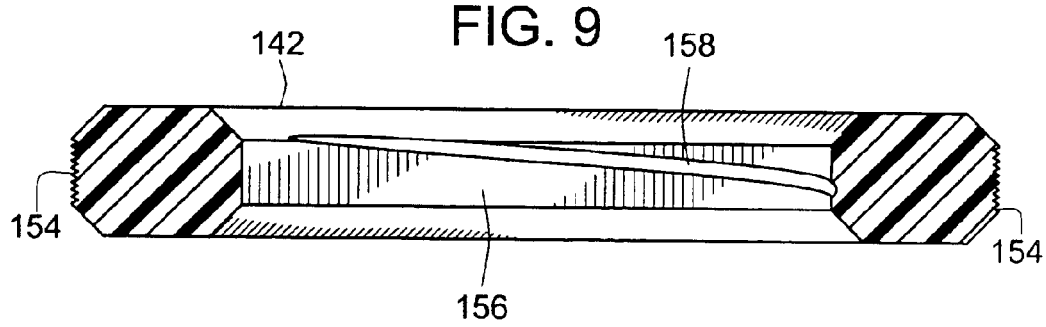
FIG. 9 is a cross-sectional illustration of the rod support bearing of FIG. 8.

In addition to these support and sealing features, the external bearing support 142, as illustrated in isometric form in FIG. 8, also provides for heat compensation and improved operation over the prior linear actuators discussed in the background section above. Specifically, the external bearing support 142 includes an outer surface 154 which includes knurling, and an inner surface 156 which includes a spiraled groove 158. Both the knurling on surface 154 and the spiral groove 158 on surface 156 provide heat compensation so that this external bearing support member 142 does not squeeze down and tighten on the extension rod 118 causing an extra load and reducing the efficiency of the linear actuator as occurs with the prior designs. The spiral groove 158 may be better seen from the cross-sectional view presented in FIG. 9 of the external bearing support member 142. In addition to providing heat compensation, this groove 158 also provides lubrication retention therein to further reduce the friction between these two elements.

Figure 10:
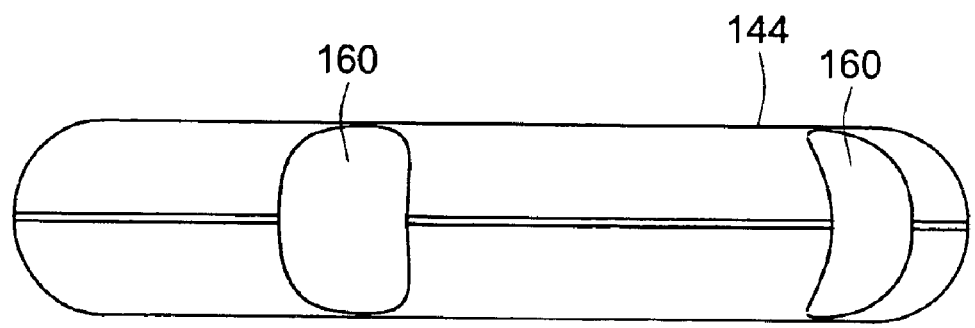
FIG. 10 is a side view illustration of the integral rod guide bearing illustrated in FIG. 7.
Figure 11:
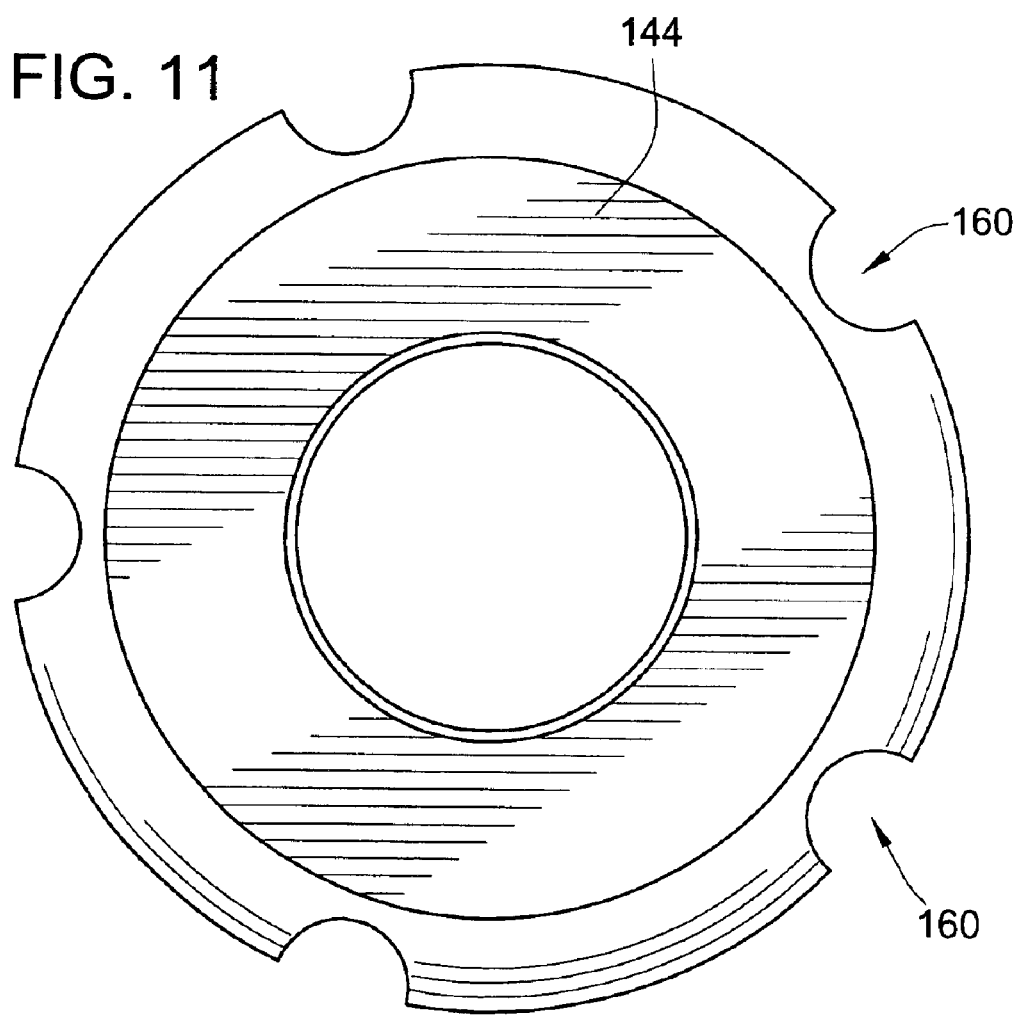
FIG. 11 is a top view illustration of the integral rod guide bearing of FIG. 10.

The internal rod guide bearing 144 also provides additional advantages besides the internal support of the extension rod 118. Specifically, and as may be better understood from an examination of FIGS. 10 and 11, the internal rod guide bearing 144 includes a plurality of transfer grooves 160 along its radial outer periphery. In this way, the internal air pressure between the two compartments separated by this internal rod guide bearing 144 within the extension rod 118 self-equalizes during operation of the actuator. As such, no additional loading is applied from the pressure differential within the extension rod 118 as occurred with the prior linear actuator designs. This pressure equalization is also aided by the provision of a port 119 in the extension rod 118. This port may also be used to lubricate the screw drive shaft 110.

Additionally, as the extension rod 118 is driven between its fully extended and fully retracted positions, lubrication may be transferred between these two cavities through the flow channels defined between the inner surface of the extension rod 118 and the transfer grooves 160. This allows the linear actuator to operate without additional loading caused by the buildup and compression of the lubrication in one area within the extension rod 118 while possibly leaving the other area between end fitting 120 and the internal rod guide bearing 144 without any lubrication. In a preferred embodiment, this internal rod guide bearing 144 is made from an acetal resin, and preferably of Delrin® acetal resin available from E.I. DuPont deNemours.

Returning again to FIG. 7, another feature of this embodiment of the present invention may also be seen. Specifically, the end of the extension rod 118 includes a threaded inner surface 162. This threaded tube connection 162 facilitates the changing to optional end fittings. This greatly enhances the applicability of the linear actuator 100 to drive various loads having different couplings thereon.

Figure 2:
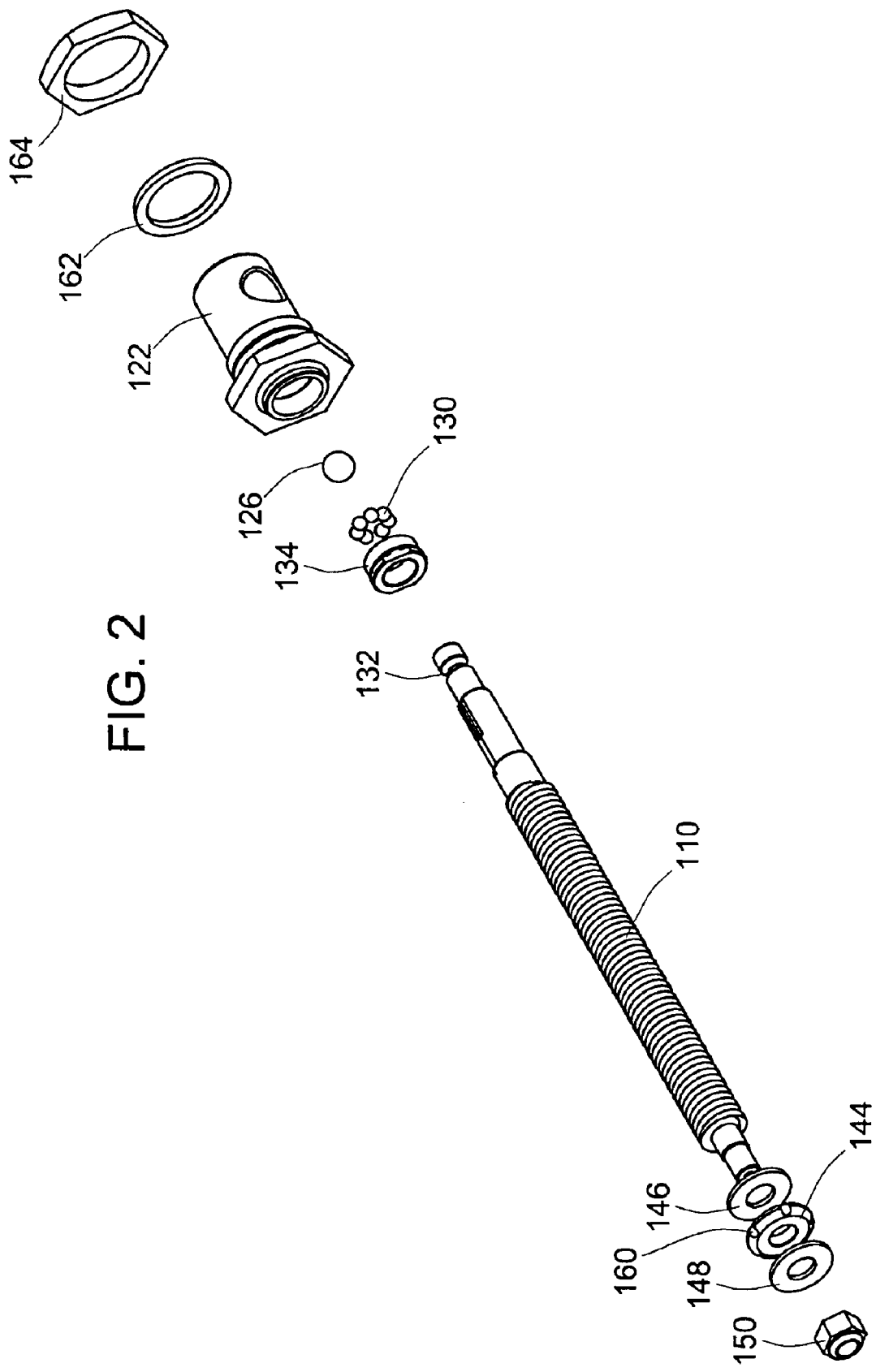
FIG. 2 is an exploded isometric view of the screw drive assembly of the electromechanical screw drive actuator of FIG. 1.

As may be seen from the exploded isometric illustration of FIG. 2, the internal rod guide support bearing 144 having its transfer grooves 160 are assembled on the end of the drive screw 110 between washers 146 and 148. As discussed above, this end rod guide support assembly is secured to the end of the screw drive shaft 110 via nut 150 in this embodiment. The opposite end of the screw drive shaft 110 is supported within the hardened end fitting 122 by the single in-line ball bearing 126 and the plurality of ball bearings 130 that are placed around the periphery of the screw drive shaft 110 within the bearing race or groove 132. These bearings 130 are held in place by bearing retainer 134 that is secured in the end of the hardened end fitting 122 as discussed above. This entire assembly is then held in the housing of the linear actuator via an end washer 162 and a housing nut 164.

Figure 12:
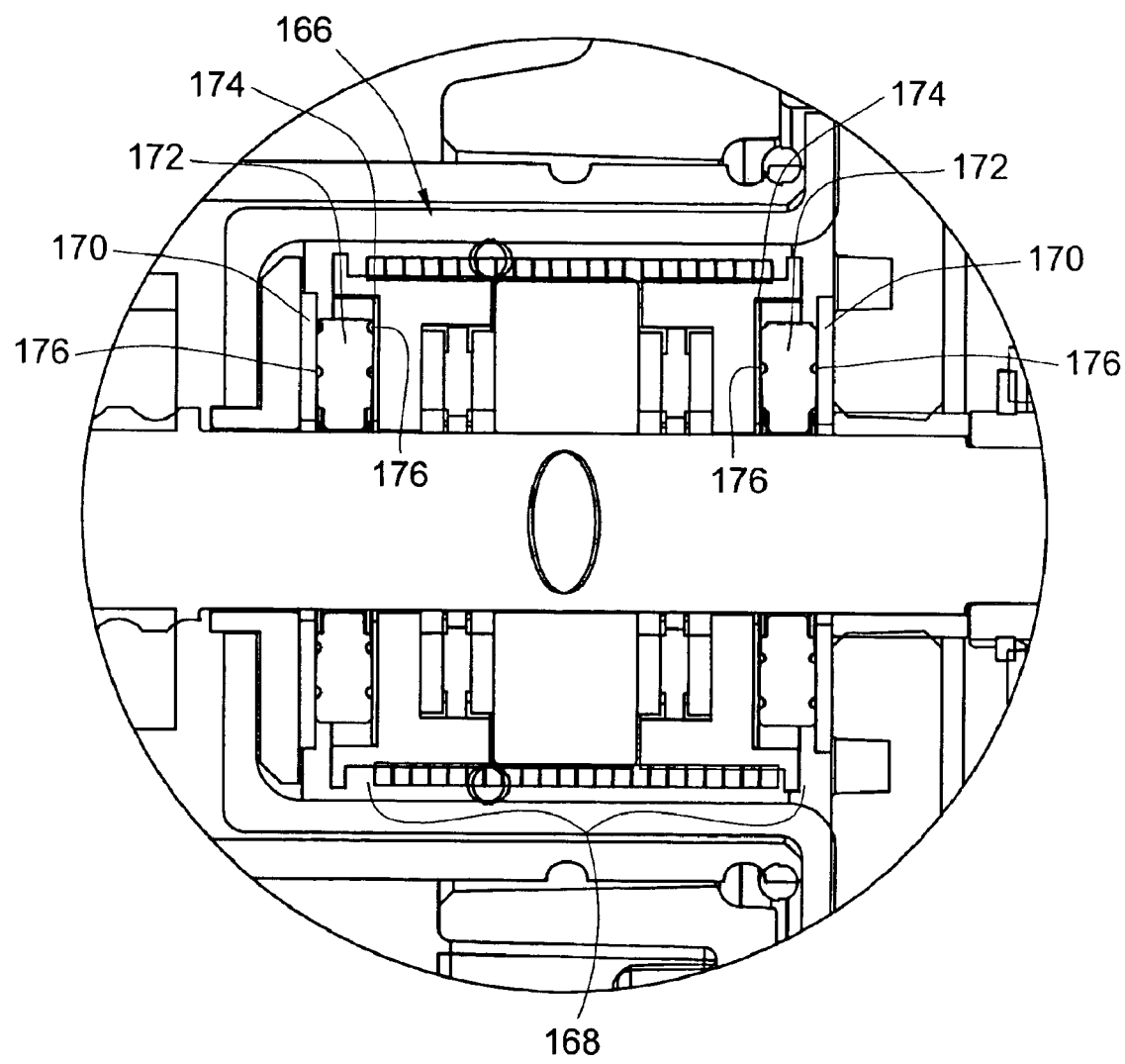
FIG. 12 is an expanded partial sectional view of the mechanical holding brake assembly of the electromechanical screw drive actuator of FIG. 1.
Figure 14:
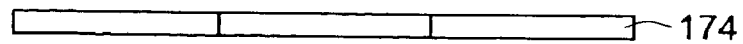
FIG. 14 is a side view illustration of the brake washer of FIG. 13.
Figure 13:
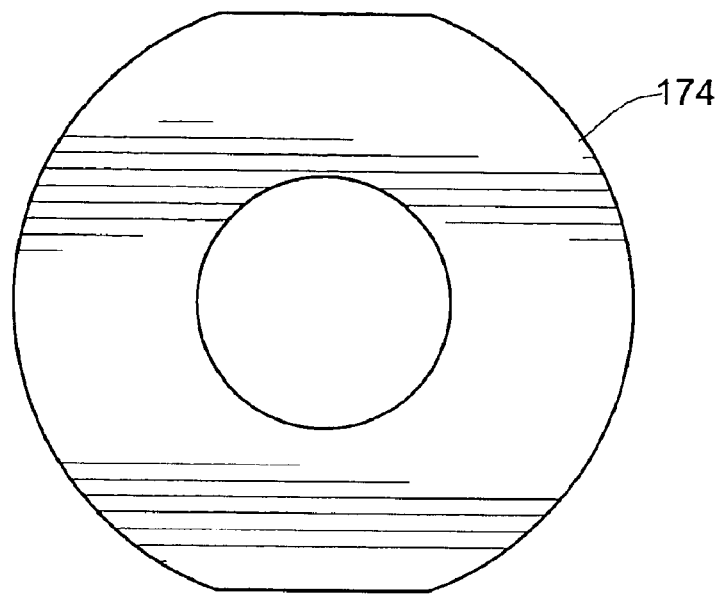
FIG. 13 is a top view illustration of an internal brake washer of the mechanical holding brake of FIG. 12.
Figure 16:
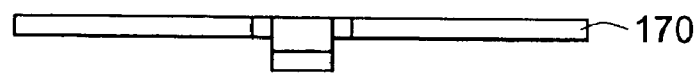
FIG. 16 is a side view illustration of the brake washer of FIG. 15.
Figure 15:
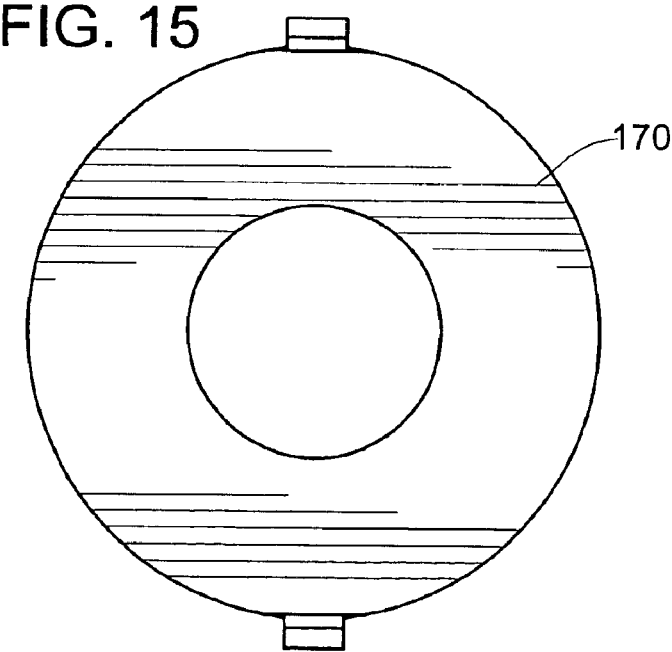
FIG. 15 is a top view illustration of a brake washer used in the mechanical holding brake assembly of FIG. 12.

Returning again to FIG. 1, this embodiment of the actuator of the present invention may also include a bi-directional holding brake 166, which is shown in an expanded partial sectional view of FIG. 12. This bi-directional holding brake 166 contains a conventional wrap spring brake member 168, the operation of which is well-known in the art. Similarly, the engagement of this brake 166 is a result of axial pressure, either trying to back drive the extension rod 118 or trying to extend this rod 118. As this pressure supplied by the load increases, it increases the friction between a shaft wear washer 170, a brake friction bearing 172, and a brake wear washer 174. This same structure is utilized on either end of the wrap spring brake member 168 to provide braking for axial loads that are applied in either direction. However, one skilled in the art will recognize that either of these may be dispensed with in particular applications where axial loading from the driven load will only occur in one direction. Further, one skilled in the art will recognize that this brake 166 may not be required depending upon the size of the load being driven as the embodiment illustrated in FIG. 1 naturally resists back driving from a load to which it is coupled.

Several unique features and distinct advantages are provided by the specific design of the two washers 170, 174 and the brake friction bearing 172 design and material selection. Since engagement and operation of the brake 166 is dependent on the relative tightness between these elements, it is important that such engagement be smooth and consistent over the operational lifetime of the brake. However, typical brake mechanisms used in linear actuators engage harshly, and have a wide load variation at which the brake is engaged resulting from the wear of these elements and build up of wear debris between the contact surface faces as discussed in the background section above. To overcome these problems, the two washers 170, 174 (illustrated in top and side view illustration in FIGS. 13–16) are subjected to special surface treating. Specifically, these washers undergo a reactionary electroless machining (REM) process to provide a very smooth finish thereon. These washers 170, 174 are then vapor blasted to a special surface finish, having a roughness of preferably between 125 to 250 on the rms scale factor. This allows the washers 170, 174 and the bearing 172 to self-burnish after assembly and operation to conform the contact surfaces. The result of this process is that the hardened, surfaced washers 170, 174 provide consistent, long life wear surfaces that demonstrate a consistent friction characteristic that results in very little load variation at which the brake engages over the operating life thereof.

Figure 18:
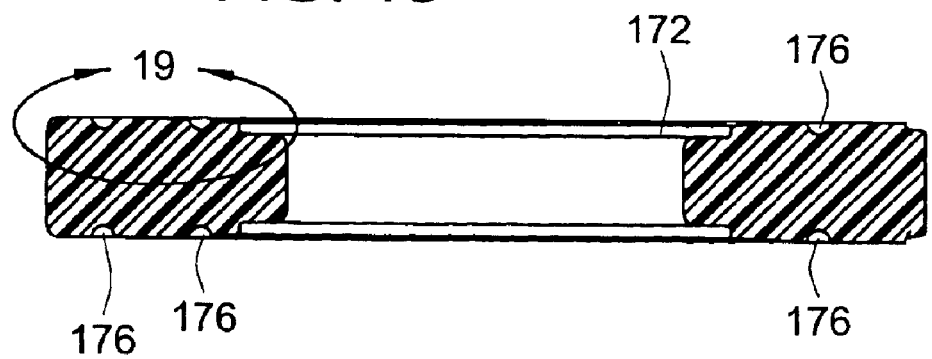
FIG. 18 is a cross-sectional illustration of the brake thrust bearing of FIG. 17.
Figure 17:
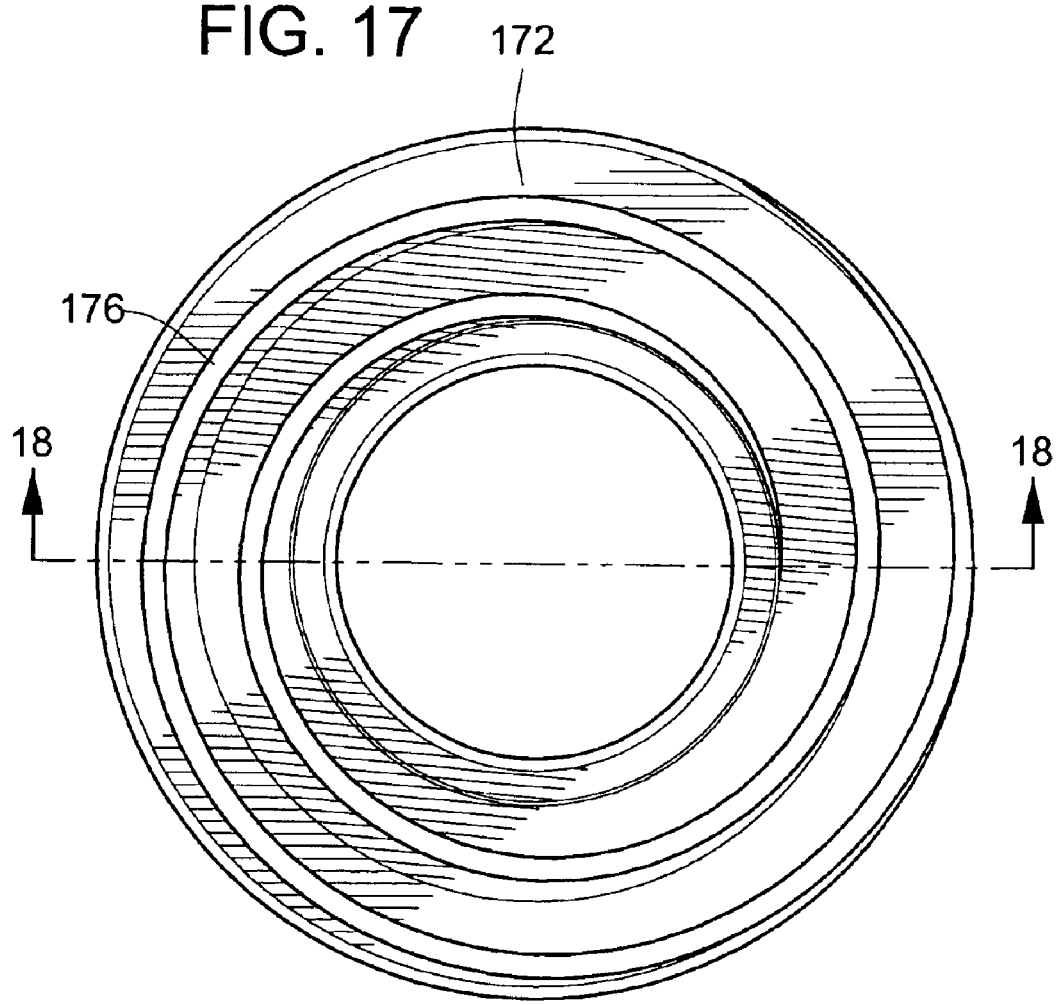
FIG. 17 is a top view illustration of a brake thrust bearing of the mechanical holding brake assembly of FIG. 12.

In conjunction with the special treatment of the washers 170, 174, the design of the brake friction bearing 172 also accounts for this consistent operation over the operational life of the brake. As may be seen from the top view illustration of FIG. 7, the brake friction bearing 172 includes grooves 176 on each of the its wear surfaces. These grooves 176 may be better seen from the cross-sectional illustration of FIG. 18. Preferably, these grooves 176 occur in a spiral fashion from the washer's inner diameter to outer diameter. These grooves provide two functions that help increase the life of the brake and provide for its consistent load engagement. First, the groove 176 provides temperature compensation, and second they provide an area for wear debris to be deposited so that such debris does not continue to reside on the contact surfaces, which tend to detrimentally affect the brakes' ability to provide consistent load engagement and can cause slippage of the brake. However, with the groove 176, and in particular with a spiral configuration of groove 176, the entire surface all the way around the contact surfaces gets swept by some portion of the groove 176 such that wear debris will be cleared from the entire surface. This ensures that the brake continues to operate smoothly and consistently over its extended life.

Figure 19:
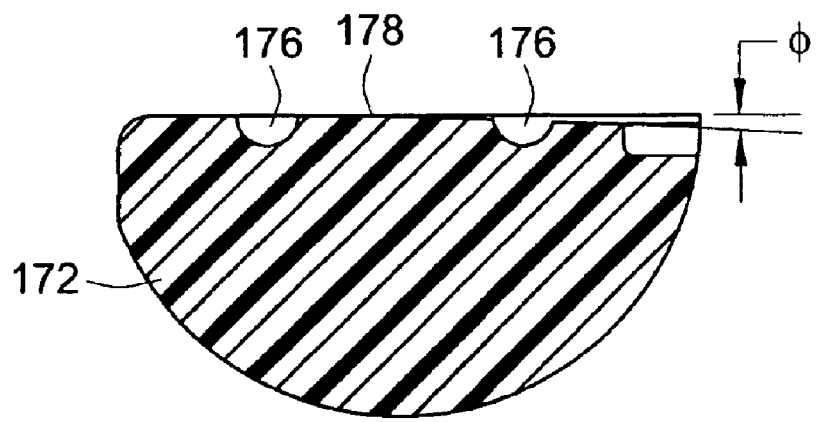
FIG. 19 is an expanded partial sectional view of a portion of the brake thrust bearing of FIG. 18.

Another feature of the brake friction bearing may be seen from the expanded partial sectional view of FIG. 19. As may be seen, the contact wear surface 178 on each side of the brake wear bearing 172 is angled slightly so that initial engagement of the washers 170, 174 will be near the outer periphery of the contact surface 178. As this outer surface wears down, and/or as additional pressure is applied from the load, additional surface area of the brake wear bearing 172 will come into contact with the washers 170, 174. This provides for longer life and smoother engagement of the brake over conventional designs which do not provide for any angling of the contact surface 178 of the brake friction bearing. Preferably, this angled surface may be from approximately one-half a degree to two degrees, and preferably is set at approximately 1.1 degree. In an alternate embodiment, this surface angling does not occur over the entire contact surface area, but instead provides for an area of flat surface to provide the minimum braking contact area, and thereafter angles down between these angular values. This relative dimensioning is set based upon the ability of the brake to engage at the minimum braking load. That is, enough surface area of the brake friction bearing 172 must be in contact with the washers 170, 174 to provide braking at the minimum load specified for the brake.

Figure 20:
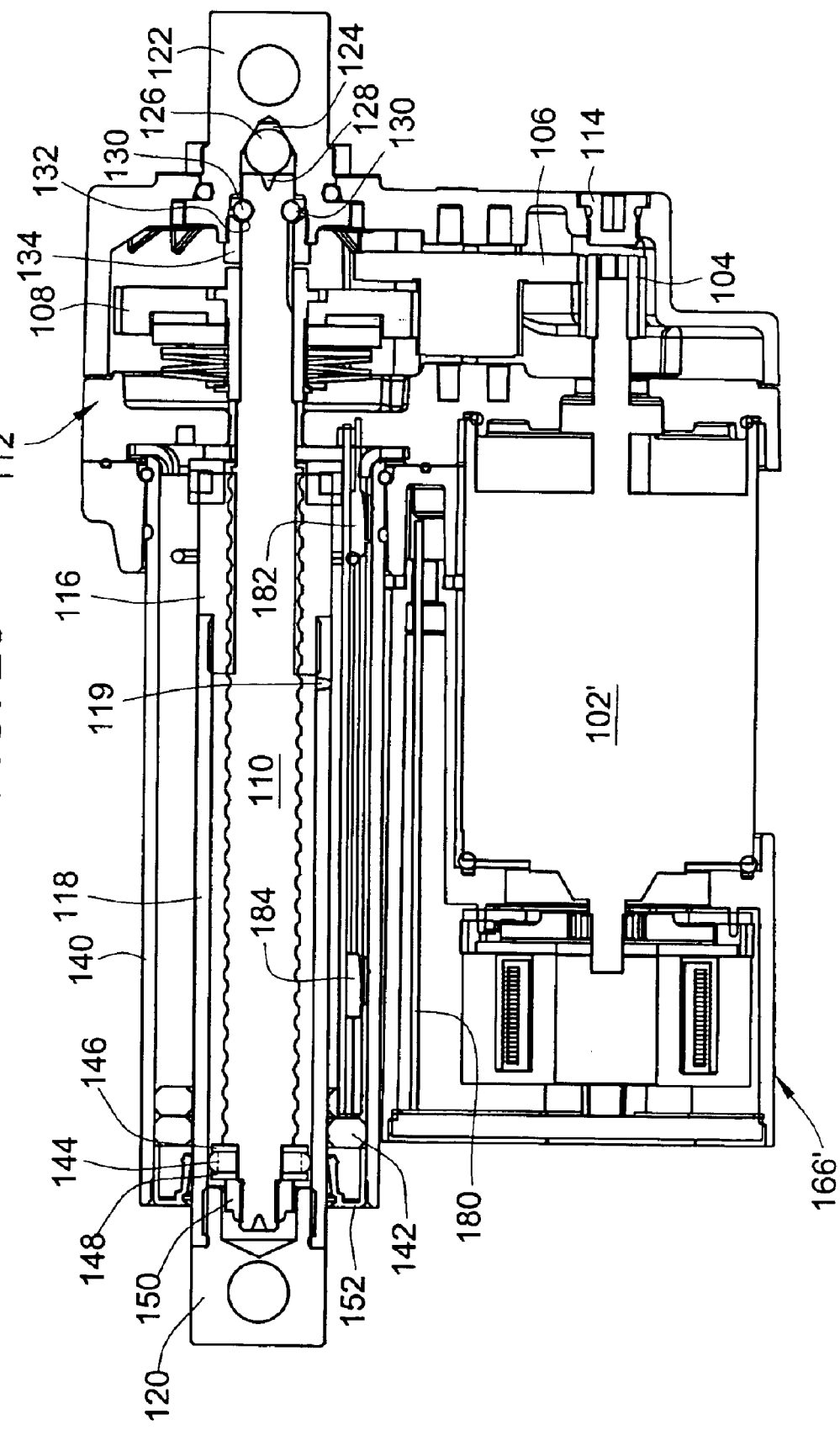
FIG. 20 is a simplified cross-sectional illustration of an alternate embodiment of an electromechanical screw drive actuator constructed in accordance with the teachings of the present invention.

Turning now to FIG. 20, there is illustrated in a simplified cross-sectional view an alternate embodiment of an electromechanical actuator mechanism constructed in accordance with the teachings of the present invention. In this alternate embodiment, the motor 102' is a double-ended-shaft motor. Utilizing such a motor 102', the brake mechanism 166' may be placed on the backside of the motor to provide the required braking to hold the load in its commanded position. Unique to this embodiment is the provision of integrated, on-board electronics mounted on a circuit board 180 within the actuator housing itself. Hall effect switches 182, 184 are integrated inside of the extension tube 140 to provide positional sensing of the extension rod 118 for use by the control electronics 180 in commanding a desired position. In one embodiment, these switches 182, 184 are used as simple limit switches to determine when the linear actuator has achieved its fully extended and fully retracted positions for use in conserving power to the electric motor. In an alternate embodiment, these switches may provide relative position sensing of the extension rod 118 to more complex electronics for greater position control and rate control as well as power saving efficiency.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A linear actuator, comprising:
   a drive screw shaft rotatable by a source of motive power;
   a nut threadably engaged on the drive screw shaft for linear translation therealong;
   a hollow extension rod drivably coupled to the nut, the extension rod adapted to accommodate the drive screw shaft therein;
   an end fitting having a bearing recess therein;
   a housing attached to the end fitting and supported upon the end fitting in a fixed relationship thereto; and
   a ball bearing seated in the bearing recess;
   wherein the drive screw shaft includes a screw pivot recess in a first end thereof sized to accommodate the ball bearing in-line with an axial plane of the drive screw shaft.

2. The actuator of claim 1, wherein the screw pivot recess, the ball bearing, and the bearing recess are arranged such that axial loading of the screw drive shaft is transferred to the end fitting without being carried by the housing of the actuator.

3. A linear actuator, comprising:
   a drive screw shaft rotatable by a source of motive power;
   a nut threadably engaged on the drive screw shaft for linear translation therealong;
   a hollow extension rod drivably coupled to the nut, the extension rod adapted to accommodate the drive screw shaft therein;
   an end fitting having a bearing recess therein;
   a ball bearing seated in the bearing recess;
   the drive screw shaft including a screw pivot recess in a first end thereof sized to accommodate the ball bearing in-line with an axial plane of the drive screw shaft;

the drive screw shaft further defining a bearing race around its outer periphery in proximity to the first end;

a plurality of ball bearings accommodated in the bearing race; and a bearing retainer fixably attached to the end fitting, the bearing retainer having an axial groove adapted to accommodate the plurality of ball bearings.

4. The actuator of claim 3, wherein the bearing race, the plurality of ball bearings, and the axial groove are arranged such that axial loading of the screw drive shaft is transferred to the end fitting without being carried by a housing of the actuator.

5. A linear actuator, comprising:

a drive screw shaft rotatable by a source of motive power;

a nut threadably engaged on the drive screw shaft for linear translation therealong;

a hollow extension rod drivably coupled to the nut, the extension rod adapted to accommodate the drive screw shaft therein;

an end fitting having a bearing recess therein;

a ball bearing seated in the bearing recess;

the drive screw shaft including a screw pivot recess in a first end thereof sized to accommodate the ball bearing in-line with an axial plane of the drive screw shaft;

an extension tube surrounding the screw shaft, the extension tube having an exit end through which the extension rod passes; and an external bearing support member positioned in proximity to the exit end between an inner surface of the extension tube and an outer surface of the extension rod, the external bearing support member having a spiraled groove in an inner surface thereof.

6. The actuator of claim 5, wherein the external bearing support member further comprises knurling on an outer surface thereof.

7. The actuator of claim 5, further comprising an internal rod guide bearing affixed to a second end of the drive screw shaft opposite the first end, the internal rod guide bearing supporting an inner surface of the extension rod, the internal rod guide further including at least one transfer groove therein.

8. The actuator of claim 7, wherein the internal rod guide is constructed from an acetal resin.

9. The actuator of claim 5, further comprising an internal rod guide bearing affixed to a second end of the drive screw shaft opposite the first end and in close planar proximity to the external bearing support member, the internal rod guide bearing supporting an inner surface of the extension rod.

10. A linear actuator, comprising;

a drive screw shaft rotatable by a source of motive power;

a nut threadably engaged on the drive screw shaft for linear translation therealong;

a hollow extension rod drivably coupled to the nut, the extension rod adapted to accommodate the drive screw shaft therein;

an end fitting having a bearing recess therein;

a ball bearing seated in the bearing recess;

the drive screw shaft including a screw pivot recess in a first end thereof sized to accommodate the ball bearing in-line with an axial plane of the drive screw shaft; and the extension rod including a threaded end adapted receive a load end fitting therein.

11. A linear actuator, comprising:

a drive screw shaft rotatable by a source of motive power;

a nut threadably engaged on the drive screw shaft for linear translation therealong;

a hollow extension rod drivably coupled to the nut, the extension rod adapted to accommodate the drive screw shaft therein;

an end fitting having a bearing recess therein;

a ball bearing seated in the bearing recess;

the drive screw shaft including a screw pivot recess in a first end thereof sized to accommodate the ball bearing in-line with an axial plane of the drive screw shaft;

the extension rod including a port in a side wall thereof.

12. A linear actuator, comprising:

a drive screw shaft rotatable by a source of motive power;

a nut threadably engaged on the drive screw shaft for linear translation therealong;

a hollow extension rod drivably coupled to the nut, the extension rod adapted to accommodate the drive screw shaft therein;

an end fitting having a bearing recess therein;

a ball bearing seated in the bearing recess;

the drive screw shaft including a screw pivot recess in a first end thereof sized to accommodate the ball bearing in-line with an axial plane of the drive screw shaft; and a wrap spring brake member having a shaft wear washer, a brake wear washer, and a brake friction bearing placed therebetween, the brake friction bearing having two contact surfaces each including a spiral groove thereon.

13. The actuator of claim 12, wherein the brake friction bearing is made from an acetal resin.

14. The actuator of claim 12, wherein the contact surfaces are angled over at least a portion thereof.

15. The actuator of claim 12, wherein the shaft wear washer and the brake wear washer each have a bearing contact surface, and where in the bearing contact surface has a surface roughness of between approximately 12 to 150 on the rms scale.

16. A linear actuator, comprising:

a drive screw shaft rotatable by a source of motive power;

a nut threadably engaged on the drive screw shaft for linear translation therealong;

a hollow extension rod drivably coupled to the nut, the extension rod adapted to accommodate the drive screw shaft therein;

an end fitting having a bearing recess therein;

a ball bearing seated in the bearing recess the drive screw shaft including a screw pivot recess in a first end thereof sized to accommodate the ball bearing in-line with an axial plane of the drive screw shaft;

at least one position sensor positioned in proximity to the extension rod to sense a position thereof, and an electronic controller integrated within a housing of the actuator, the electronic controller using the sensed position from the position sensor to control the source of motive power.

17. The actuator of claim 16, further comprising a second position sensor positioned in proximity to the extension rod to send position thereof, the two position sensors being axially positioned relative to one another to sense a maximum and a minimum linear position of the extension rod.

18. The actuator of claim 17, wherein the position sensors are Hall effect limit switches.

19. The actuator of claim 16, wherein the source of motive power is a double-ended shaft motor, further comprising a brake mechanism operably coupled to a back end of the motor.

20. An axial load support and transfer structure for use in a linear screw drive actuator having a drive screw shaft rotatable by a source of motive power, a nut threadably engaged on the drive screw shaft for linear translation therealong, a hollow extension rod drivably coupled to the nut, and the extension rod adapted to accommodate the drive screw shaft therein, comprising:

an end fitting having a bearing recess therein;

a ball bearing seated in the bearing recess;

wherein the drive screw shaft includes a screw pivot recess in a first end thereof sized to accommodate the ball bearing in-line with an axial plane of the drive screw shaft; and wherein the drive screw shaft further defines a bearing race around its outer periphery in proximity to the first end;

a plurality of ball bearings accommodated in the bearing race; and a bearing retainer fixably attached to the end fitting, the bearing retainer having an axial groove adapted to accommodate the plurality of ball bearings.

21. The axial load support and transfer structure of claim 20, wherein the screw pivot recess, the ball bearing, and the bearing recess are arranged such that axial loading of the screw drive shaft in a first axial direction is transferred to the end fitting without being carried by a housing of the actuator, and wherein the bearing race, the plurality of ball bearings, and the axial groove are arranged such that axial loading of the screw drive shaft in a second axial direction is transferred to the end fitting without being carried by a housing of the actuator.

* * * * *

UNITED STATES PATENT AND TRADEMARK OFFICE
CERTIFICATE OF CORRECTION

PATENT NO. : 6,927,513 B2
DATED : August 9, 2005
INVENTOR(S) : Dennis Michael Schreier It is certified that error appears in the above-identified patent and that said Letters Patent is hereby corrected as shown below:

Column 12,
Line 35, change "where in" to -- wherein --.
Line 36, change "12" to -- "125" --.
Line 47, after "recess", insert -- ; --.

Signed and Sealed this

Eighteenth Day of October, 2005

JON W. DUDAS
*Director of the United States Patent and Trademark Office*